(No Model.)

J. P. CULVER.
PIPE.

No. 429,844. Patented June 10, 1890.

Witnesses,
*[signatures]*

Inventor,
John P. Culver
By Dewey & Co.
Attys

UNITED STATES PATENT OFFICE.

JOHN P. CULVER, OF LOS ANGELES, CALIFORNIA.

PIPE.

SPECIFICATION forming part of Letters Patent No. 429,844, dated June 10, 1890.

Application filed November 22, 1889. Serial No. 331,234. (No model.)

*To all whom it may concern:*

Be it known that I, JOHN P. CULVER, a citizen of the United States, residing at Los Angeles, Los Angeles county, State of California, have invented an Improvement in Pipes; and I do hereby declare the following to be a full, clear, and exact description of the same.

My invention relates to the class of pipes which are specially adapted for water, gas, and drain pipes, and also for use as conduits for laying electric wires underground; and it especially relates to that class of pipes which are formed of a volute of sheet metal covered with and rolled up in asphaltum; and my invention consists in the improved pipe hereinafter described and claimed.

Figure 1:
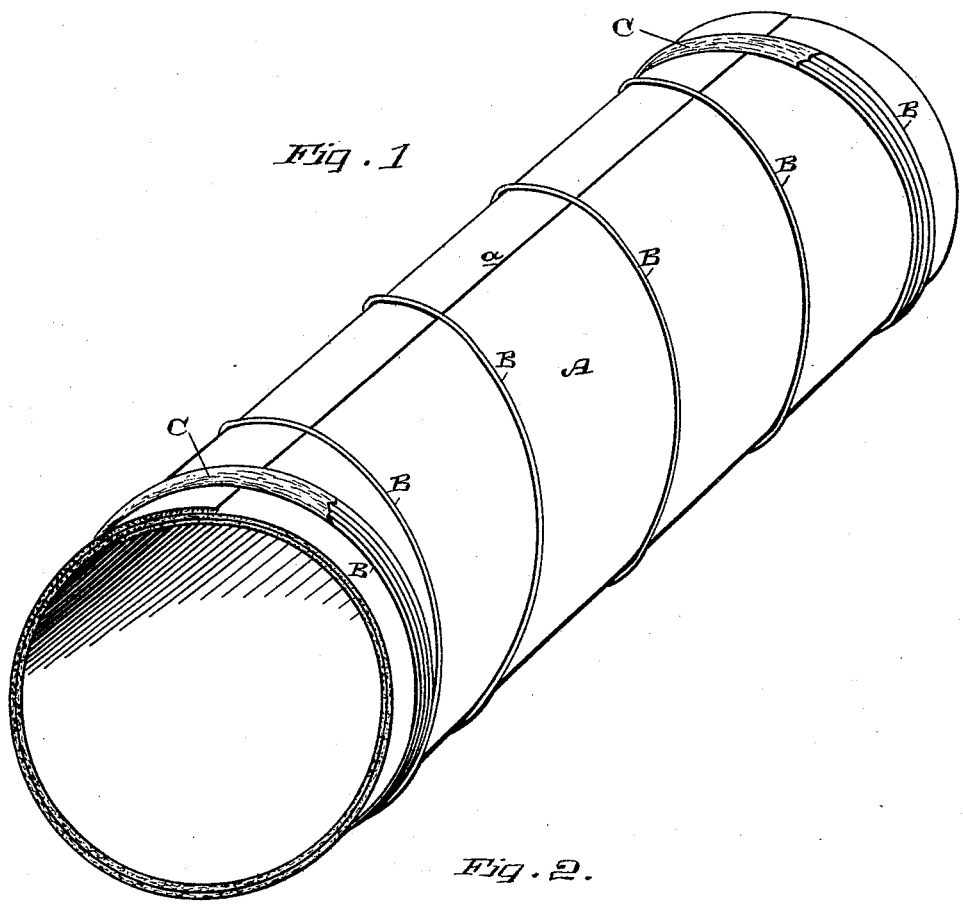
Figure 2:
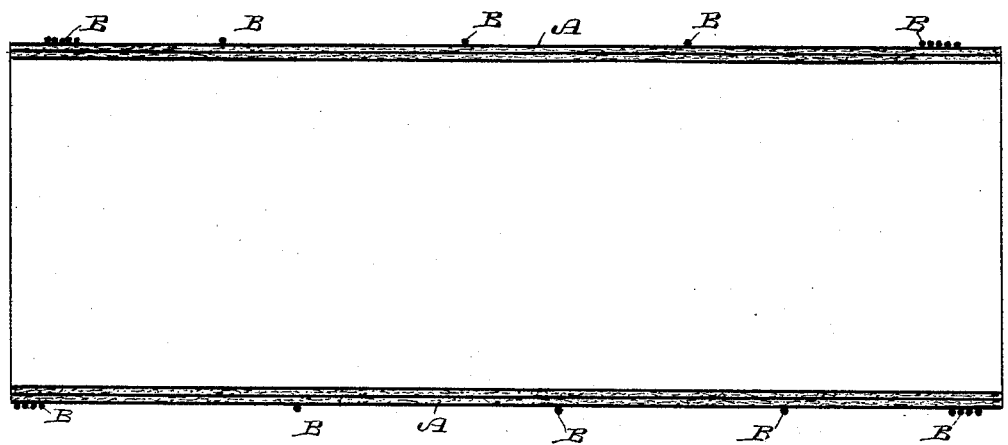

Referring to the accompanying drawings for a more complete explanation of my invention, Figure 1 is a perspective view of my pipe. Fig. 2 is a longitudinal section of the same.

The pipe A is made in sections of suitable length, each section consisting of a single sheet of metal, which is first covered with asphaltum, and is then rolled up in hot liquid asphaltum into a volute, making as many turns upon itself as may be desired for the thickness of the pipe, so that the pipe in section consists of a layer of asphaltum outside and inside, layers of metal, and an intervening layer or layers of asphaltum. Pipes of this character are not new in the present state of the art, but the difficulty with them is the keeping down of the lap of the pipe, (indicated at *a*,) which under the influence of the sun, heat, or other causes has a tendency to rise. To prevent this, I bind the exterior of the pipe with metal, either as bands or hoops, or wire, as shown by B, so that the pipe itself is fully strengthened and its lap kept down. The pipe thus formed is well adapted for all the uses intended for it—namely, as a drain-pipe, as a conveyer of water or gas, or as a conduit for cheaply laying electric wires underground. The sections of pipe are joined together by making one end fit the other, as a stove-joint, sometimes called a "slip-joint," or they may be made of the same diameter at the ends and joined with a sleeve.

I am aware, as before stated, that a pipe formed of a volute of sheet metal rolled up and covered with asphaltum is not now new, and I am also aware that it is not new to band the exterior of circular or cylindrical bodies. I do not claim either of these, broadly, but seek to protect the pipe which I have described so banded, whereby I provide a new article of manufacture which is especially adapted for the uses mentioned.

For greater strength and consequent security, I unite several bands or hoops or the folds of the wire by solder, (shown at C,) placing it where needed. This is especially advantageous for the wire wrapping, which, as shown, is wound several times around, side by side at each end, or wherever else required, and these several laps become practically one strong one by being soldered.

Having thus described my invention, what I claim as new, and desire to secure by Letters Patent, is—

1. A water, gas, drain, or electrical conduit pipe, as a new article of manufacture, and consisting of a volute of sheet metal covered with and rolled up in asphaltum, and its exterior bound with suitable metal bands or wrappings, which are soldered together, substantially as herein described.

2. A water, gas, drain, or electrical conduit pipe, as a new article of manufacture, and consisting of a volute of sheet metal covered with and rolled up in asphaltum, and its exterior bound with wire wrapped side by side several laps around at places desired, said laps being soldered together, substantially as herein described.

In witness whereof I have hereunto set my hand.

JOHN P. CULVER.

Witnesses:
R. W. BALFOUR,
FRANK A. DONECKEN.